J. A. Bidwell.

Metal Drill.

Nº 70,686.    Patented Nov. 12, 1867.

Witnesses:    Inventor:

United States Patent Office.

JASON A. BIDWELL, OF EAST BOSTON, MASSACHUSETTS.

Letters Patent No. 70,686, dated November 12, 1867.

IMPROVED TAPERING-DRILL.

*The Schedule referred to in these Letters Patent and making part of the same.*

TO ALL WHOM IT MAY CONCERN:

Be it known that I, JASON A. BIDWELL, of East Boston, in the county of Suffolk, State of Massachusetts, have invented an improved Metal Drill; and I do hereby declare the following to be a full, clear, and exact description thereof, reference being had to the accompanying drawings, making part of this specification, in which—

Similar letters of reference indicate corresponding parts in the several figures.

The object of this invention is to produce a drill, by means of which tapering holes may be drilled in the heads of wood-screws, or other metal objects, at one operation of drilling, so as to avoid the necessity of a second operation of reaming out cylindrical holes in order to give them the proper taper.

The nature of my invention consists in the application to a cylindrical spirally-grooved drill, for drilling metal, of a twisted wedge-shaped cutting lip, which shall succeed the cutting lips in the end of the drill in the act of drilling, and ream out a tapering hole, as will be hereinafter described.

To enable others skilled in the art to understand my invention, I will describe its construction and operation.

The instrument which I am about to describe is designed particularly for the purpose of drilling tapering holes in the heads of wood-screws to receive a tapering screw-driver, but its use is not confined to the drilling of screw-heads, as it is adapted for drilling tapering holes in metal generally.

Figure 2:
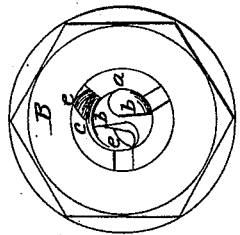
Figure 2 is an end view of fig. 1.
Figure 4:
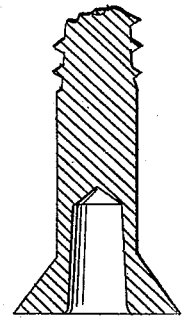
Figure 4 is a sectional view of a wood-screw, having a tapering hole drilled in its end.
Figure 1:
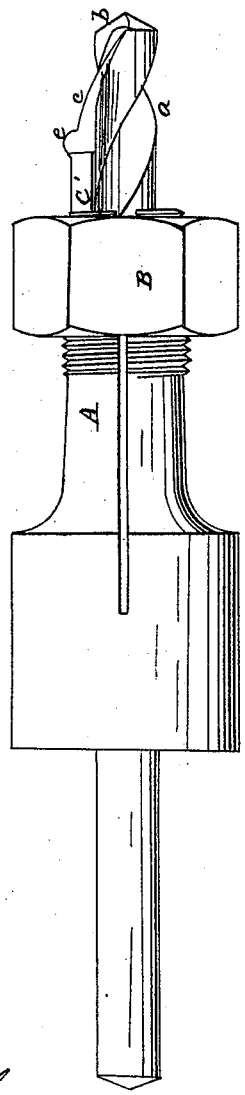
Figure 1 is a side view of the improved drill secured to its holder or chuck.
Figure 3:
Figure 3 is a view of the spiral tapering lip and its burr-cutter.

The drill $a$ is of a cylindrical form, with two spiral grooves formed in it, terminating in a conical cutting point, with radial cutting lips $b$ $b$, the edges of which I prefer to have straight, instead of curved. This drill is properly centred and confined in the cylindrical split chuck A, by means of the clamping-nut B, working on a male screw, which is formed in the tapering end of the chuck, as shown in fig. 1. Any suitable form of chuck or drill-holder, which is adapted for being applied to the end of a spindle, may be employed, but I prefer to adopt the one shown in the drawings, because of its simplicity and adaptedness for the purpose intended. To the drill $a$ I apply a twisted cutting lip, $c$, which is formed on a shank, $c'$, and adapted for being received in one of the spiral grooves of the drill, as shown in figs. 1 and 2. The twist of the lip $c$ corresponds somewhat to the pitch or twist of the drill, so that the back edge of this cutter $c$ will fit snugly in one of the grooves of the drill, and extend from the base of one of the cutting edges thereof to a bevelled shoulder or cutter, $e$, on the end of the shank $c'$. The cutting edge of the lip $c$ also extends from the cutter $e$ in a spiral line to the conical end of the drill, and gradually increases in height, as it leaves said end, until it terminates at the bevelled cutter $e$, where it is the highest or furthest from the axis of the drill.

When the end of the cylindrical body of the drill enters the metal, in the operation of drilling, the cutting-lip $c$ begins to enlarge the hole, and, as the drill progresses, the hole is increased in diameter, until the proper depth of hole is attained, when the cutting lip $e$ will finish the work of trimming the burr at the edge of the hole.

It will be seen that the twisted lip or reamer $c$ will discharge its chips, and also allow of the free discharge of chips from the cutting lips on the end of the drill, by the spiral action of the grooves of this drill.

When the burring shoulder $e$ is formed on the shank of the reaming lip $c$, this will determine the depth of spiral hole which can be drilled, so that different lengths of lips must be used for different depths of holes. But where these lips are not used, holes varying considerably in depth may be made without changing the reamer. The manner of confining the reamer upon the drill is to insert its shank in a slit between two of the segment ends of the chuck A, before screwing up the clamping-nut, so that when this nut is set up it will confine the drill and reamer firmly in place.

While, therefore, I prefer to employ the cutting lip or shoulder $e$, not only for drilling holes in screw-heads, but for other purposes, I do not confine my invention to its use in conjunction with the reamer $c$.

Having described my invention, what I claim as new, and desire to secure by Letters Patent, is—

1. A twisted reamer, $c$, which is adapted to serve, in conjunction with a spirally-grooved drill, $a$, for making tapering holes in metal, substantially as described.

2. The construction of a cutting shoulder, $e$, upon the shank $c'$ of a twisted reamer, $c$, substantially as described and for the purpose specified.

JASON A. BIDWELL.

Witnesses:
   WM. B. W. HALLETT,
   STEPHEN A. COOKE, Jr.